(12) United States Patent
Kim et al.

(10) Patent No.: US 7,688,576 B2
(45) Date of Patent: Mar. 30, 2010

(54) DISK DRIVE MOUNTING SYSTEM

(75) Inventors: David S. Kim, Irvine, CA (US); Stanley Chen, Taoyuan (TW)

(73) Assignee: Gateway, Inc., Irvine, CA (US)

( * ) Notice: Subject to any disclaimer, the term of this patent is extended or adjusted under 35 U.S.C. 154(b) by 22 days.

(21) Appl. No.: 12/156,916

(22) Filed: Jun. 5, 2008

(65) Prior Publication Data

US 2009/0303677 A1  Dec. 10, 2009

(51) Int. Cl.
*G06F 1/16* (2006.01)
(52) U.S. Cl. .................................................. 361/679.33
(58) Field of Classification Search ............. 361/679.33
See application file for complete search history.

(56) References Cited

U.S. PATENT DOCUMENTS

| | | | |
|---|---|---|---|
| 5,995,365 A | 11/1999 | Broder et al. | |
| 6,227,516 B1 | 5/2001 | Webster | |
| 6,487,081 B2 | 11/2002 | Homer | |
| 7,495,904 B2 * | 2/2009 | Liang et al. | 361/727 |
| 2004/0095716 A1 | 5/2004 | McAlister | |

* cited by examiner

*Primary Examiner*—Lisa Lea-Edmonds
(74) *Attorney, Agent, or Firm*—WPAT, P.C.; Anthony King (57) ABSTRACT

A disk drive holder for removably receiving a disk drive to removably mount the drive on a drive mounting cage, comprising a first structure configured to engage a first corner edge of the disk drive housing that is located at a juncture of the front end and the first side of the drive housing. The holder may also include a second structure configured to engage a second corner edge of the disk drive housing that is located at a juncture of the rear end and the second side such that opposite corner edges of the drive housing are engaged when the drive housing is positioned in the holder. The holder further includes a connecting structure connecting the first structure and the second structure together. A mounting cage may receive the holder, and may have an aperture engaged by an engaging tab on the holder to resist removal from the cage.

4 Claims, 9 Drawing Sheets

DISK DRIVE MOUNTING SYSTEM

BACKGROUND OF THE INVENTION

1. Field of the Invention

The present invention relates to systems for mounting a disk drive in or on a computer chassis, and more particularly pertains to a new disk drive mounting system that facilitates simple installation and removal of the disk drive on a computer chassis with minimal effort.

2. Description of the Prior Art

Known hard disk drive mounting systems typically include some type of external latch to be locked in place after the disk drive has been inserted into place in the drive support cage of the computer chassis (and conversely the latch must be released when the disk drive is to be removed from the cage). Installation of the disk drive thus requires the completion of a two step process: inserting the disk drive into the cage and then locking the latch. Unfortunately, the step of locking the latch during assembly of the computer may sometimes be forgotten, which can cause dislodging of the disk drive during shipping and damage to the computer. Removal of the disk drive from the cage requires also a two step process typically performed in separate motions.

To avoid the two step process, other known systems employ a carrier that mounts on the hard disk drive and inserts into the cage as a unit. While two distinct steps for removing the disk drive are avoided, the assembler must still use two hands to release the carrier from the cage and then pull the carrier and disk drive from the cage. Thus, while an improvement on the two step installation and removal processes, this system is still believed to be overly complex and requires too much effort by the assembler. In the highly competitive area of computer manufacture, even a small amount of additional time and/or effort spent on assembling each computer unit is magnified when a production line of hundreds or thousands of units is considered, and therefore it is believed that an improvement in this process that further streamlines the disk drive mounting process is desirable for the significant cost benefits achievable over the many units typically manufactured.

SUMMARY OF THE INVENTION

The present invention provides a new system that facilitates simple installation and removal of the disk drive in or on a computer chassis with minimal effort, particularly by simplifying the actions required to install and remove disk drives on the computer chassis.

In one aspect of the invention, a disk drive holder is disclosed for removably receiving a disk drive to removably mount the disk drive on a drive mounting cage. The disk drive may have a housing with a front end, a rear end with at least one connector positioned thereon, a first side extending between the front end and the rear end, and a second side extending between the front end and the rear end. The disk drive holder may comprise a first structure configured to engage a first corner edge of the disk drive housing that is located at a juncture of the front end and the first side when the disk drive housing is positioned in the disk drive holder. The disk drive holder may further comprise a second structure configured to engage a second corner edge of the disk drive housing that is located at a juncture of the rear end and the second side such that opposite corner edges of the disk drive housing are engaged when the disk drive housing is positioned in the disk drive holder. The disk drive holder may also comprise a connecting structure connecting the first structure and the second structure together.

In another aspect of the invention, a disk drive holder is disclosed for removably receiving a disk drive having a housing with a front end, a rear end, a first major surface extending between the front end and the rear end, a second major surface extending between the front end and the rear end, a first side surface extending between the front end and the rear end, a second side surface extending between the front end and the rear end. The disk drive holder may comprise a front end portion for positioning adjacent to at least a portion of the front end of the disk drive housing when the disk drive housing is positioned in the disk drive holder, and a first side portion for positioning adjacent to the first side of the disk drive housing when the disk drive housing is positioned in the disk drive holder. The disk drive holder may further comprise a first face portion for positioning adjacent to the first major surface of the disk drive housing when the disk drive housing is positioned in the disk drive holder, and a second face portion for positioning adjacent to the second major surface of the disk drive housing when the disk drive housing is positioned in the disk drive holder.

In yet another aspect of the invention, a disk drive mounting system is disclosed for mounting at least one disk drive on a computer chassis. The disk drive may be of the type having a housing with a front end, a rear end, a first major surface extending between the front end and the rear end, a second major surface extending between the front end and the rear end, a first side surface extending between the front end and the rear end, a second side surface extending between the front end and the rear end. The disk drive mounting system may comprise a drive mounting cage for mounting on a chassis of a computer, with the drive mounting cage including a perimeter wall defining and interior with a rear opening. The drive mounting system may further comprise a disk drive holder for removably receiving a disk drive and being removably mountable on the drive mounting cage to removably mount the disk drive on the drive mounting cage. The disk drive holder may comprise a front end portion for positioning adjacent to at least a portion of the front end of the disk drive housing when the disk drive housing is positioned in the disk drive holder, and a first side portion for positioning adjacent to the first side of the disk drive housing when the disk drive housing is positioned in the disk drive holder. The disk drive holder may further comprise a first face portion for positioning adjacent to the first major surface of the disk drive housing when the disk drive housing is positioned in the disk drive holder, and a second face portion for positioning adjacent to the second major surface of the disk drive housing when the disk drive housing is positioned in the disk drive holder.

The foregoing is a general outline of the more important elements of the invention, and the detailed description of this application that follows discloses additional features of the invention which form the subject matter of the claims appended hereto.

A significant feature of many embodiments of the present invention is the ability to allow the at least partial removal of the disk drive holder from the drive mounting cage with a single hand, so that the disk drive can be removed from the disk drive holder.

Further advantages of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects of the invention will become apparent when consideration is given to the following detailed description thereof. Such description makes reference to the annexed drawings wherein.

DESCRIPTION OF PREFERRED EMBODIMENTS

With reference now to the drawings, and in particular to FIGS. 1 through 9 thereof, the new disk drive mounting system of the invention will be described.

The disk drive mounting system 20 of the invention provides a means for mounting at least one, and optionally more than one, disk drive 1 on a computer chassis 2. The invention is most highly suitable for the mounting of hard disk drives that employ a plurality of magnetic disks as a storage medium, although other types of disk drives (such as, for example, optical disk drives) and other types of computer components that need to be mounted on a computer chassis may be employed. Although the size and shape of the outer housing 3 of disk drives may vary, typically the size and shape is standardized into one or more form factors that set the general parameters of the size and shape of the outer housing so that disk drives differing in manufacturer, capacity, bus type, or the like are substantially interchangeable. Consequently, virtually no alteration of the mounting structure needs to be made to switch between drives of the different characteristics set forth above, so long as the form factor is the same. Thus, while the following description will discuss the invention in terms of hard disk drives of the form factor generally referred to as the 3.5 inch size, it should be realized that the invention may be suitably employed for other sizes and types of disk drives as well as other types of components. Further, the invention may find application outside of the conventional personal computer and its chassis.

For the purposes of description of the invention, the disk drive housing 3 (see FIG. 2) may be considered to have a front end 4 having a front surface 5 and a rear end 6 having a rear surface 7, the rear surface typically having at least one data and/or power connector 8 positioned thereon. In some cases, the disk drive housing 3 may have one connector for both power and data, and in other cases the data and power may be provided through separate connectors. A first major surface 9 of the housing 3 extends between the front end 4 and the rear end 6, and a second major surface 10 also extends between the front end and the rear end of the housing 3 on an opposite side of the housing. A first side surface 11 extends between the front end 4 and the rear end 6 of the housing, and a second side surface 12 also extends between the front end and the rear end. For the purposes of this description, the disk drive housing 3 may be considered to have a width W that is measured between the first side surface 11 and the second side surface 12, a height H that is measured between the first major surface 9 and the second major surface 10, and a depth D that is measured between the front end surface 5 and the rear end surface 7.

In general, the disk drive mounting system 20 of the invention may include a drive mounting cage 22 for mounting on the chassis 2 (see FIG. 9) of a computer or other information handling system and at least one disk drive holder 24 that is mountable in the drive mounting cage. The system 20 may be configured such that the disk drive holder 24 is trapped against complete removal from the mounting cage 22, while permitting partial withdrawal of the holder 24 from the cage 22 to allow a disk drive to be mounted on the holder 24 and then the holder 24 is reinserted into a fully inserted or seated position in the cage 22.

The drive mounting cage 22 may include a perimeter wall 26 which defines an interior 27 for receiving the disk drive, and a rear opening 28 through which the disk drive may be inserted into the interior of the cage 22. At least one set of tracks 30 may be defined by the perimeter wall 26 for receiving and guiding the disk drive holder 24 when inserted in the cage 22. Each set of tracks 30 may comprise a pair of tracks, with one track 32 being located on one side of the perimeter wall 26 and another track 34 positioned at a substantially opposite location on the perimeter wall 26 so that the tracks are positioned an opposed arrangement. In one embodiment of the invention, each track 32, 34 comprises at least one, and optionally two, pair of tabs extending from the perimeter wall 26 into the interior 27 of the cage. In some embodiments, the perimeter wall includes two sets of tracks, so that two disk drives may optionally be mounted on the cage. Other embodiments may include more than two sets of tracks to accommodate more than two disk drives. In other embodiments, portions of the perimeter wall 26 may form part of the guiding tracks. The perimeter wall 26 of the drive mounting cage 22 may comprise an upper section 36, a lower section 38 that is located opposite of the upper section, and a pair of side sections 40, 42 that extend between the upper section and the lower section. Each track of a set of tracks 30 may thus be positioned on one of the side sections 40, 42 of the perimeter wall 26. Each of the side sections 40, 42 may have a rearward edge 44, and at least one of the side sections 40, 42 may have an aperture 46 that extends through the side section at a location that may be adjacent to the rearward edge. The aperture 46 may be positioned in line with the tracks, so that a disk drive holder 24 positioned in the set of tracks is positioned adjacent to the aperture.

The disk drive holder 24 is configured to removably receive a disk drive 1 to thereby removably mount the disk drive 1 on the drive cage 22 in a manner that does not require additional fasteners to mount the holder 24 to the disk drive housing 3. The disk drive holder 24 is most suitably formed of a single piece with several portions, but could be formed of more than one piece.

Figure 1:
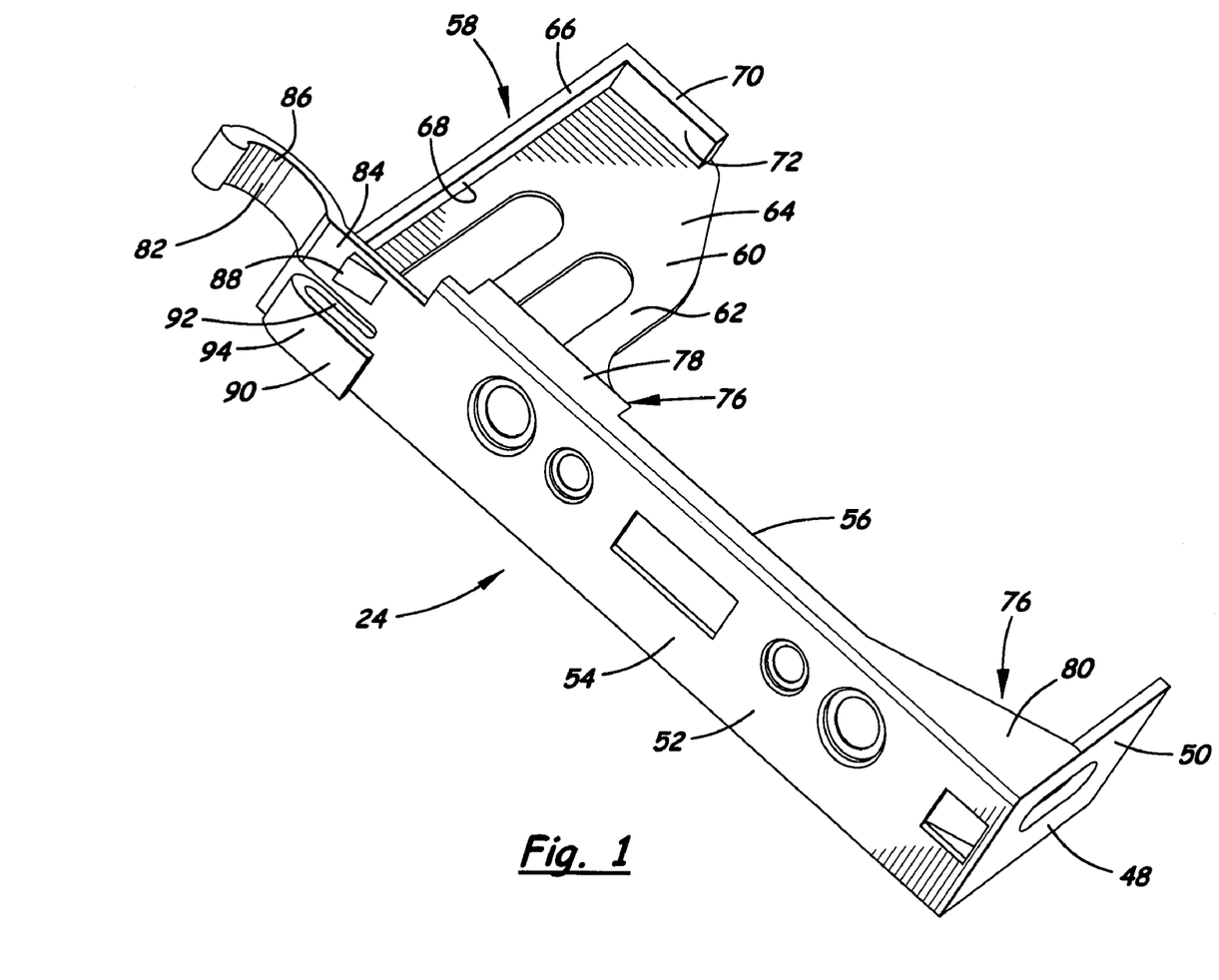
FIG. 1 is a schematic perspective view of the disk drive holder of the present invention shown isolated from a disk drive and the disk mounting cage.
Figure 2:
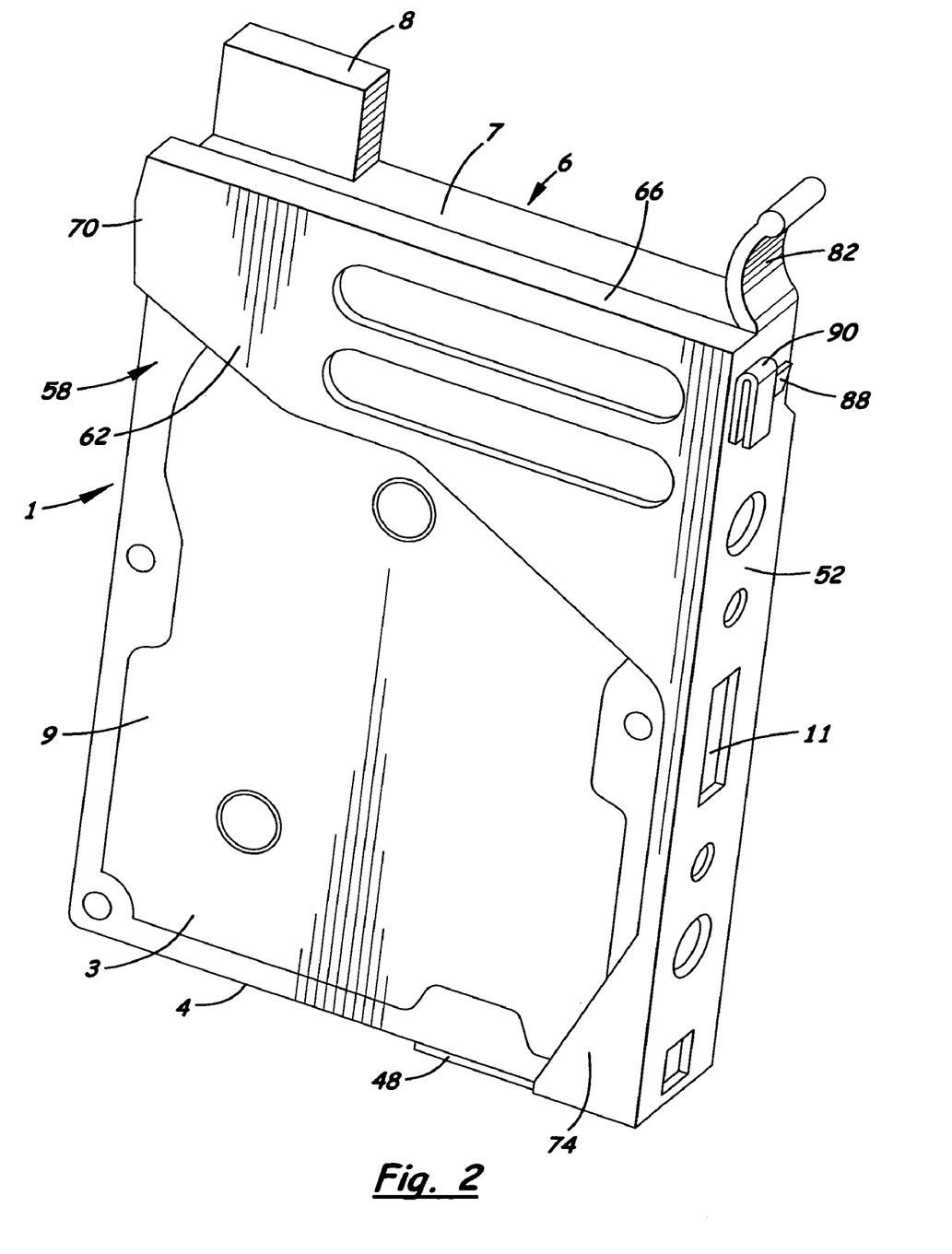
FIG. 2 is a schematic perspective view of the disk drive holder mounted on a disk drive and particularly shows the first face portion of the holder positioned adjacent to the first major face of the disk drive housing.
Figure 3:
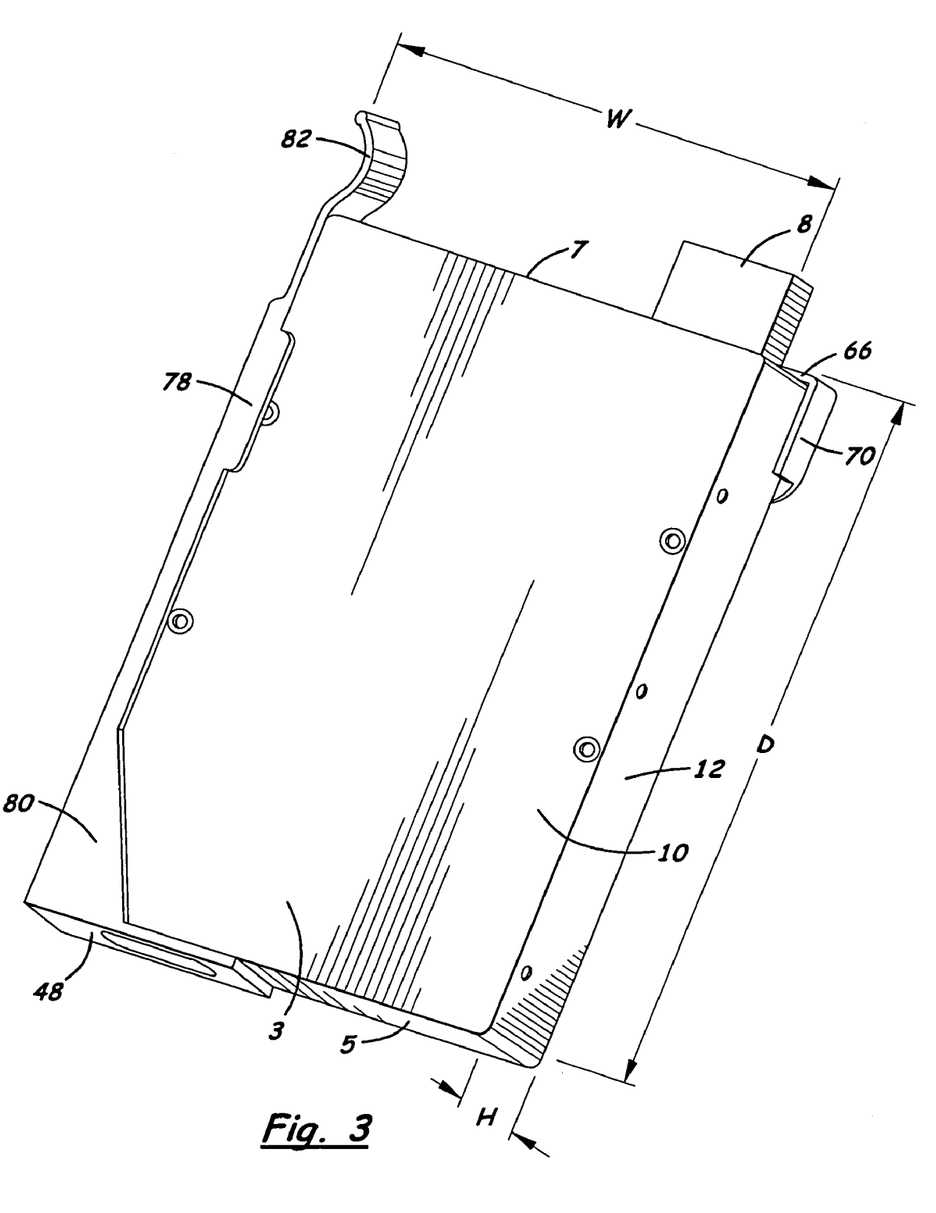
FIG. 3 is a schematic perspective view of the disk drive holder mounted on a disk drive and particularly shows the holder with respect to the second major face of the disk drive housing.
Figure 4:
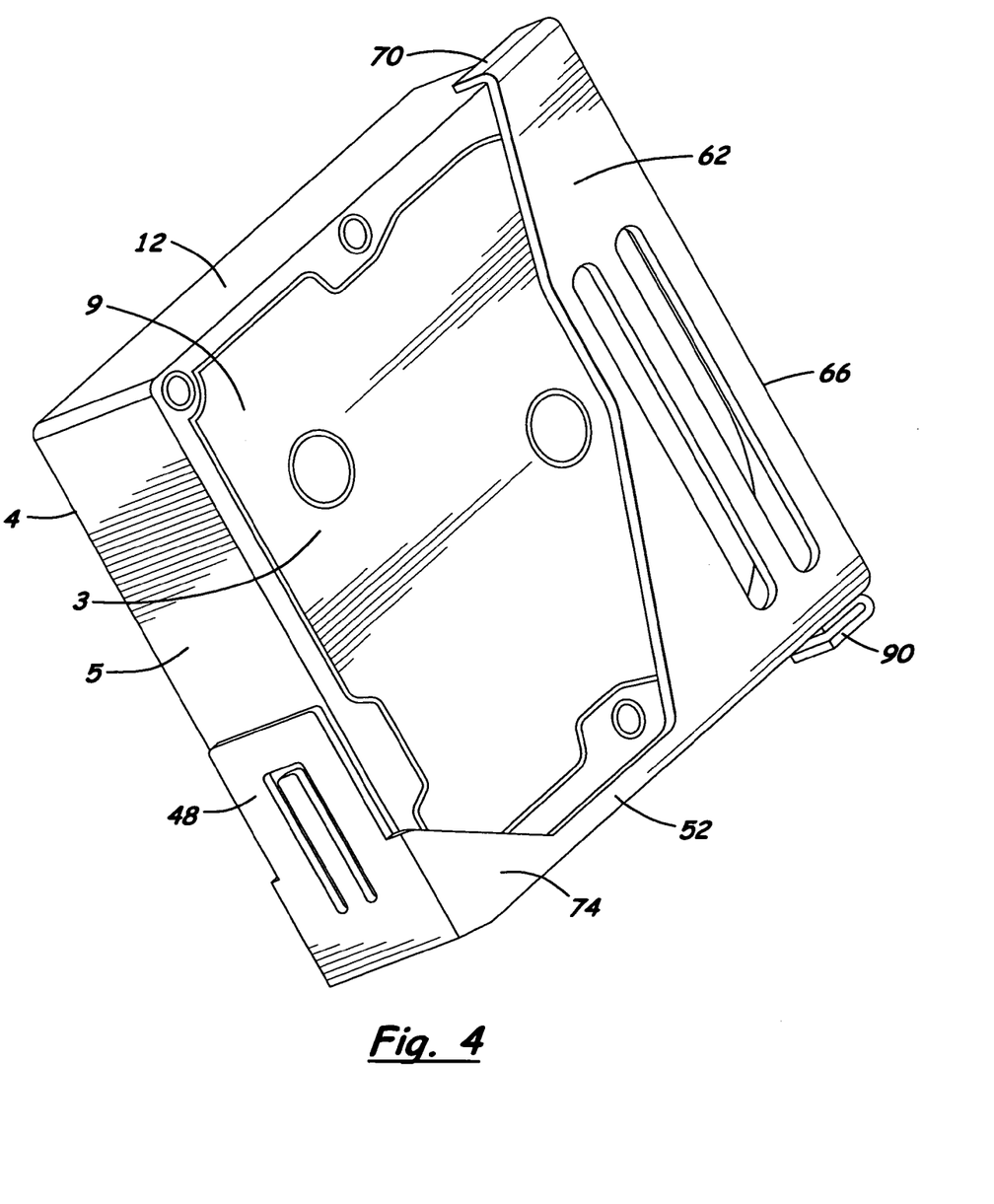
FIG. 4 is a schematic perspective view of the disk drive holder mounted on the disk drive and particularly shows the holder with respect to the rear end of the disk drive housing.
Figure 5:
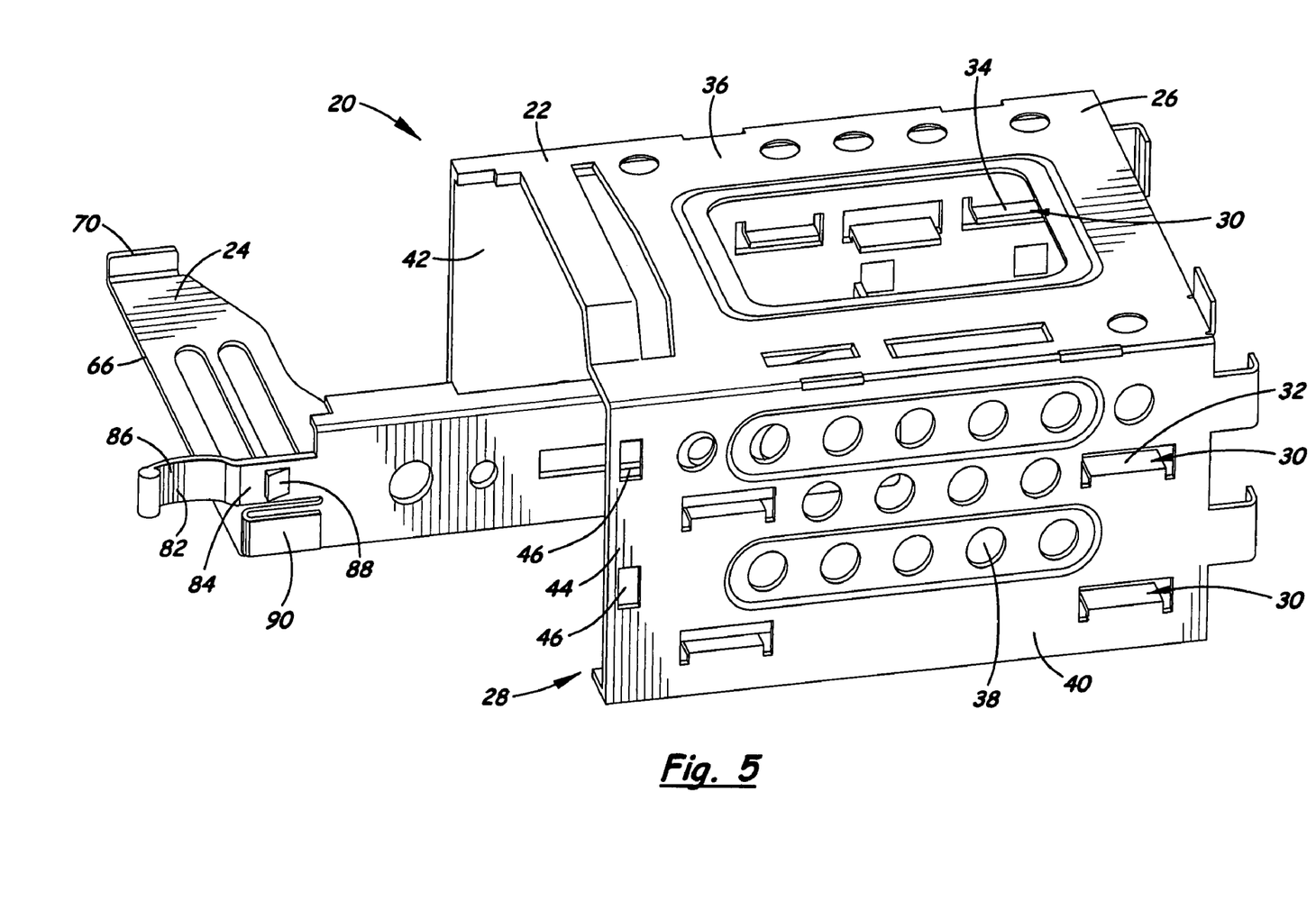
FIG. 5 is a schematic perspective view of the disk drive holder partially inserted into the drive mounting cage.
Figure 6:
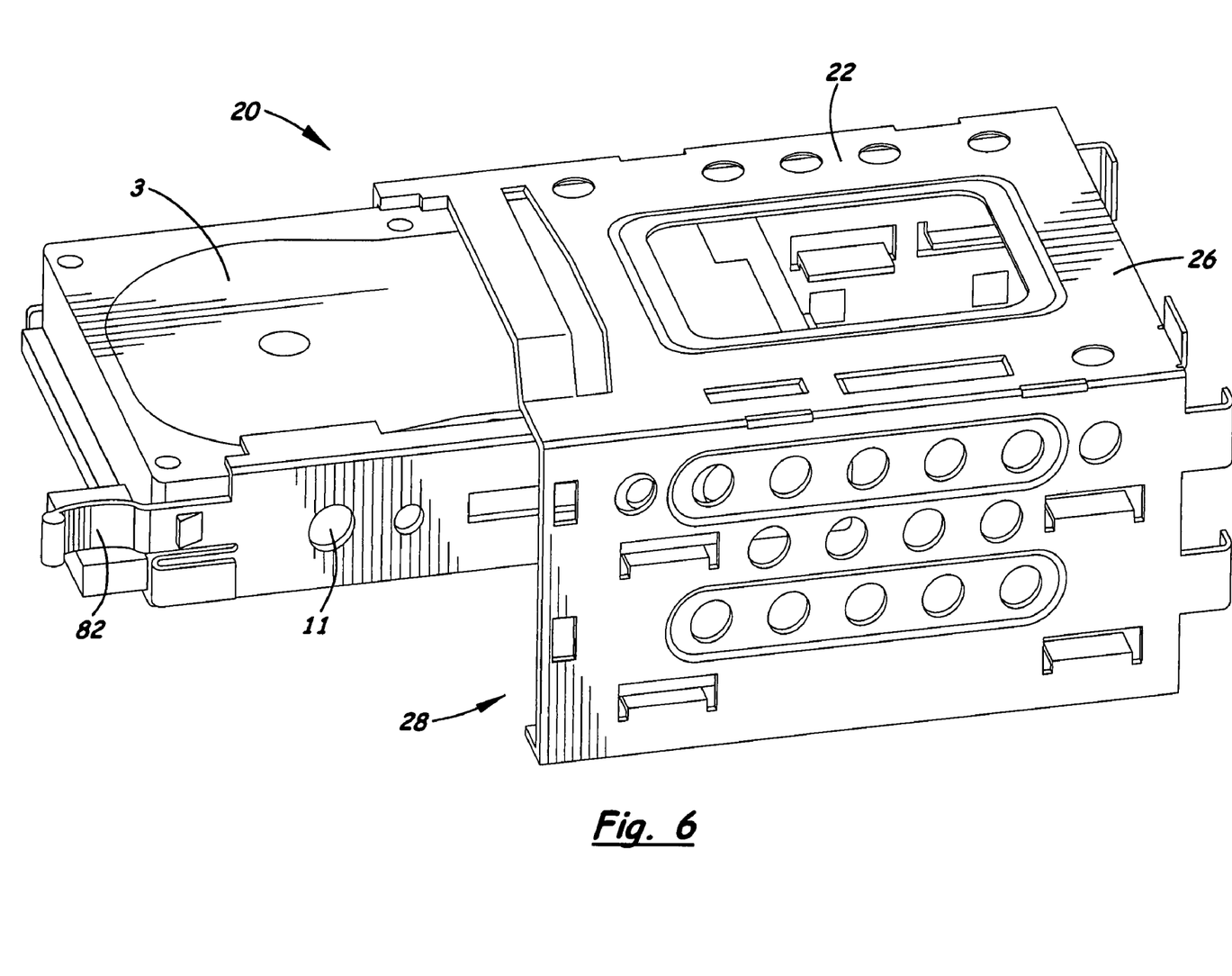
FIG. 6 is a schematic perspective view of a disk drive mounted on the disk drive holder, which is partially inserted into the drive mounting cage.
Figure 7:
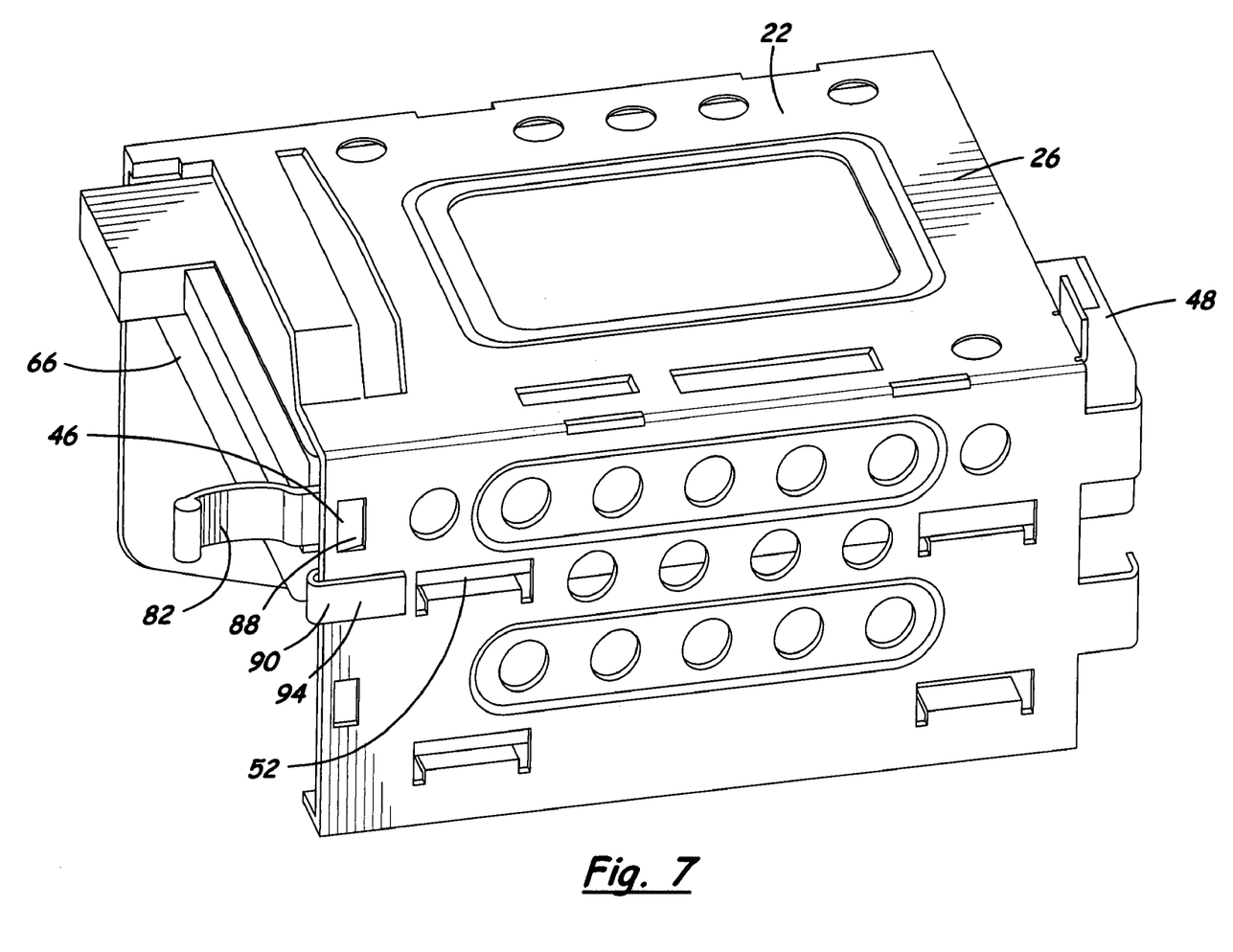
FIG. 7 is a schematic perspective view of the disk drive and disk-drive holder fully inserted into the drive mounting cage.
Figure 8:
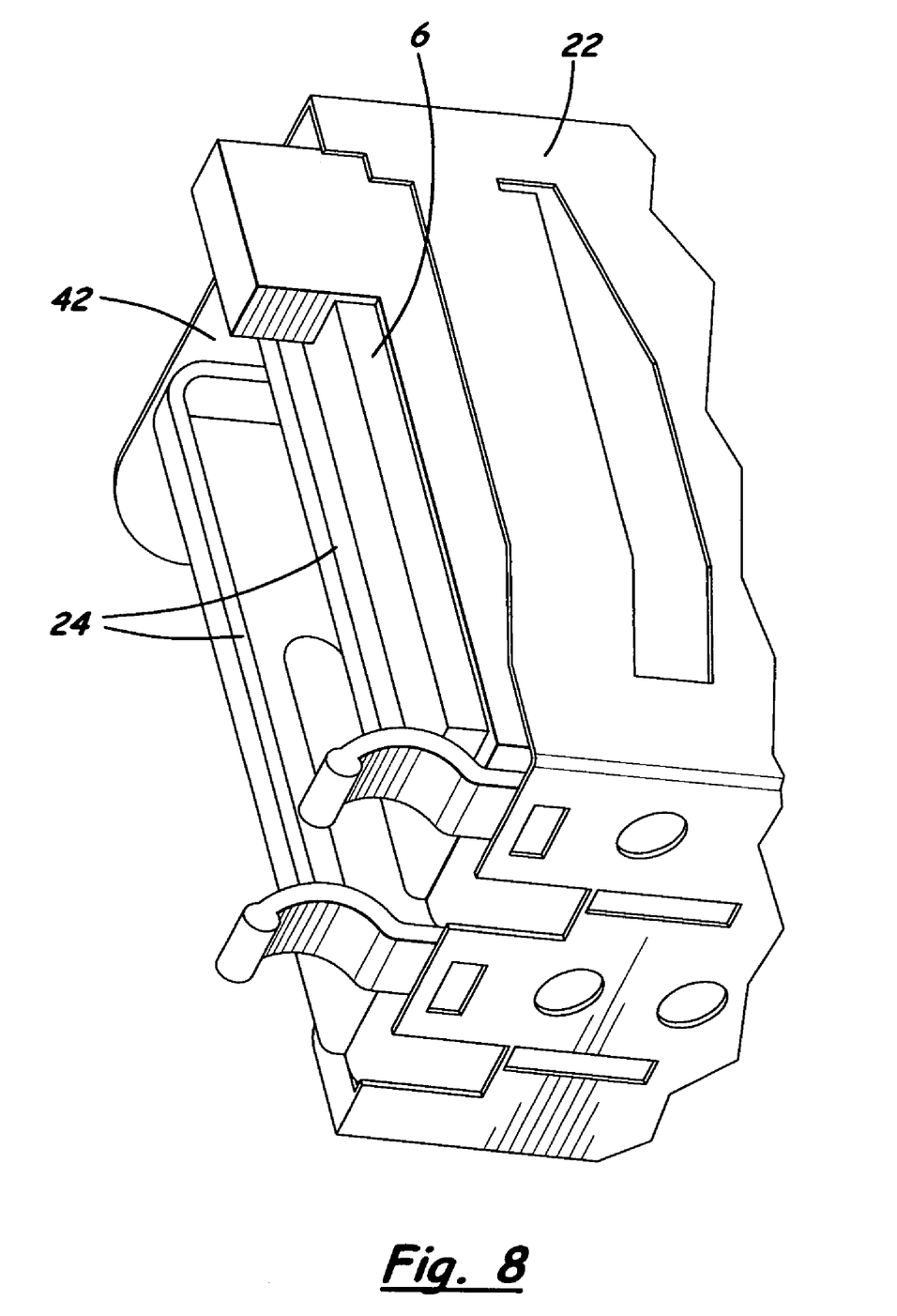
FIG. 8 is a schematic perspective view of a portion of the disk drive mounting cage with a pair of the disk drive holders inserted into the cage, with a disk drive being positioned in one of the holders and the other holder being empty.
Figure 9:
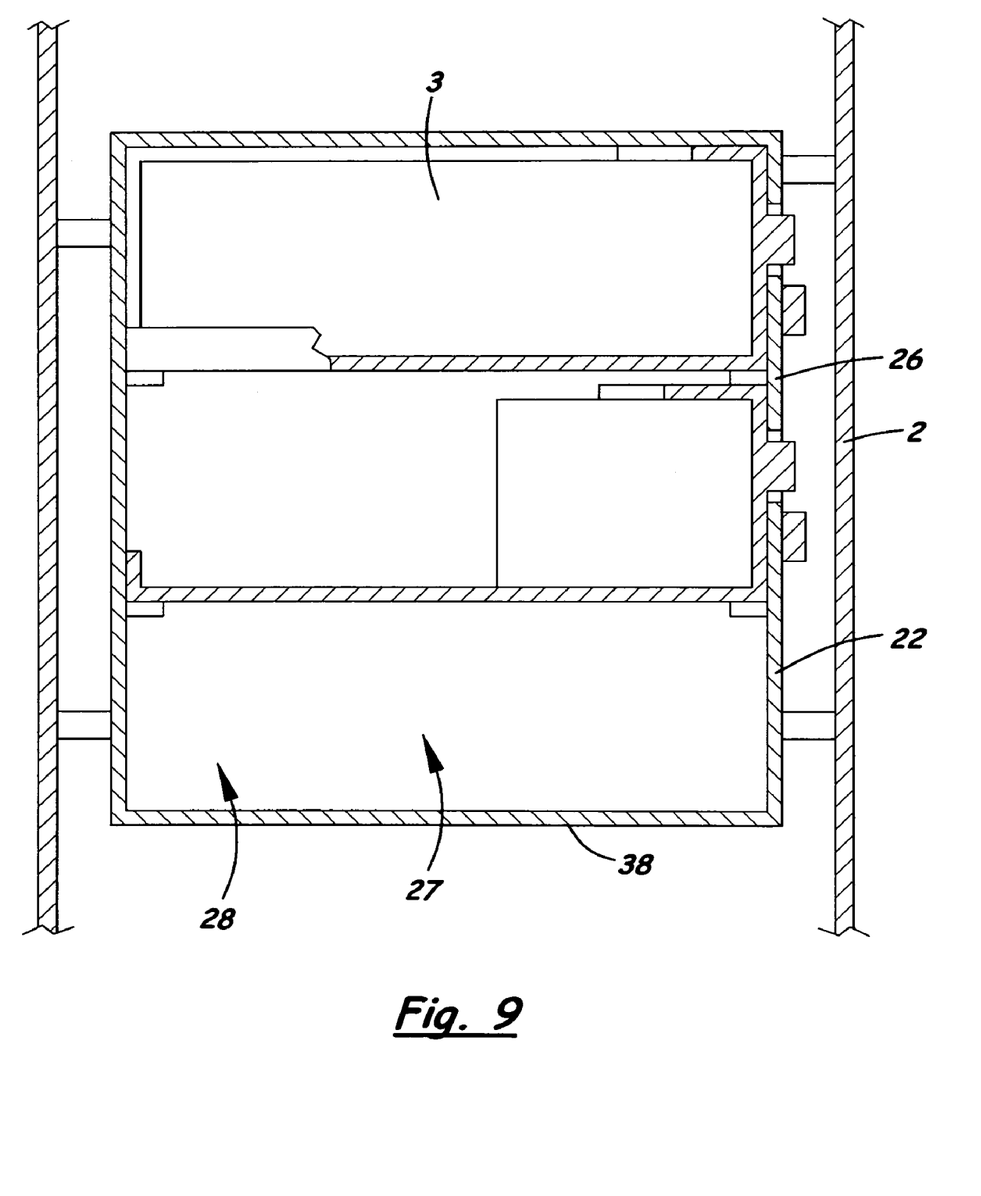
FIG. 9 is a schematic end sectional view of the drive mounting cage showing one bay occupied by a holder having a disk drive positioned therein and a second bay with an empty disk drive holder mounted therein.

The disk drive holder 24 may include a front end portion 48 for positioning adjacent to at least a portion of the front end 4 of the disk drive housing 3 (see FIGS. 2 through 4). The front end portion 48 may abut against at least a portion of the surface 5 of the front end 4 of the disk drive housing when the disk drive housing is positioned in the disk drive holder. The front end portion 48 may be configured to extend along au portion of the width W of the disk drive housing from the first side of the housing 3 when the housing is received in the holder 24. In the broadest sense, the portion of the front end surface 5 that the front end portion 48 extends along may be less than 100 percent of width W. In some embodiments, the portion of the front end surface 5 that the front end portion 48 extends along may be between approximately 10 percent of width W and approximately 50 percent of width W, and in other embodiments is between approximately 20 percent of width W and 40 percent of width W. In the illustrative embodiment, the front end portion 48 comprises a front end wall 50 of substantially uniform thickness that is configured to extend along and abut a portion of the front end surface 5 of the disk drive housing adjacent to the first side surface 11.

The holder 24 may further include a first side portion 52 for positioning adjacent to the first side surface 11 of the disk drive housing 3. The first side portion 52 may be configured to abut against the first side surface 11 of the disk drive housing 3 when the housing is positioned in the disk drive holder 24. The first side portion 52 extends rearwardly from the front end portion 48, and preferably, although not necessarily, is joined to the front end portion. As noted above, the front end portion 48 of the holder 24 extends from the first side portion 52 toward the second side surface 12 of the housing 3 when the disk drive 1 is positioned in the holder 24. The first side portion 52 may comprise a first side wall 54 that has a first inner surface 56 for abutting or engaging the first side surface 11 of the housing 3. The first side portion 52 may extend along a portion of the first side surface 11 of the housing that is less than the entire depth D of the disk drive housing 3 when the housing is positioned in the holder 24. Illustratively, in some embodiments the portion of the first side surface 11 that the first side portion 52 extends along may be between approximately 50 percent of depth D and approximately 95 percent of depth D, and in other embodiments between approximately 75 percent of the depth D and approximately 90 percent of the depth D. The portion of the first side surface 11 along which the first side portion extends may be measured from the rear end surface 7. The first side wall 54 may be oriented substantially perpendicular to the front end wall 50.

The disk drive holder 24 of the invention may also include a first face portion 58 for positioning adjacent to the first major surface 9 of the disk drive housing 3. The first face portion 58 may comprise one or more sections that are positionable adjacent to the first major surface 9. The first face portion 58 may include a first section 60 that extends away from the first side portion 52. The first section 60 may comprise a main portion 62 which has an inner surface 64 that may be oriented substantially perpendicular to the first inner surface 56 of the first side portion 52 for positioning adjacent to the first major surface 9 of the disk drive housing 3 when the housing 3 is positioned in the disk drive holder 24.

The first section 60 of the first face portion 58 may also comprise a rear lip portion 66 that is positioned on the main portion 62 and is configured to engage the rear end surface 7 of the disk drive housing 3 when the housing 3 is positioned in the disk drive drive holder 24. The rear lip portion 66 includes a rear lip surface 68, and functions to hold the disk drive housing 3 against the front end portion 48 of the holder 24. Significantly, the rear lip portion 66 is configured such that it does not extend across the entire depth D of the rear end surface 7 of the housing 3 when the disk drive 1 is positioned in the holder 24. The rear lip portion 66 may extend along only a portion of the height H of the housing 3 from the first major surface 9, so that upon mounting and dismounting of the disk drive housing 3 on the holder 24, the rear lip portion is relatively easily slipped over and past the edge of the housing between the first major surface 9 and the rear end surface 7. It will be recognized that the rear lip portion 66 may extend along a portion up to approximately 100 percent of the height H of the first major surface 9 of the housing 3 of the disk drive. Illustratively, in some embodiments the rear lip portion 66 may extend along a portion of the height H from the first major surface 9 that is between approximately 10 percent of the height H to approximately 60 percent of the height H, and in other embodiments the rear lip portion 66 may extend along between approximately 20 percent of the height H to 50 percent of the height H.

The first section 60 of the first face portion 58 may further comprise a side lip portion 70 that is positioned on the main portion 62 and includes a side lip surface 72 that is configured to engage the second side surface 12 of the disk drive housing 3 when the housing is positioned in the holder to thereby hold the housing against the first inner surface 56 of the first side portion 52. Somewhat similarly to the rear lip portion 66, the side lip portion 70 is configured such that it does not extend across the entire height H of the second side surface 12 of the housing 3 when the disk drive 1 is positioned in the holder 24. While the side lip portion 70 may extend across the entire height H of the housing 3 from the first major surface 9, in some embodiments the side lip portion 70 my extend across only a portion of the height H of the housing 3, so that upon mounting and dismounting of the disk drive housing 3 on the holder 24, the side lip portion is relatively easily slipped over and past the edge of the housing between the first major surface 9 and the second side surface 12. Illustratively, in some embodiments the side lip portion 70 extends along a portion of the height H from the first major surface 9 that is between approximately 10 percent of the height H to approximately 60 percent of the height H, and in other embodiments the side lip portion 70 extends along between approximately 20 percent of the height H to 50 percent of the height H.

The first face portion 58 of the holder 24 may also include a second section 74 that extends between the front end portion 48 and the first side portion 52, and is preferably connected to both the front end portion and the first side portion. The second section 74 of the first face portion may have a substantially triangular shape that extends across the corner formed between the portions 48 and 52.

The disk drive holder 24 may also include a second face portion 76 for positioning adjacent to the second major surface 10 of the disk drive housing 3 when the housing is positioned in the holder 24. The second face portion 76 may comprise a first section 78 that extends inwardly from the first side portion 52 and toward the side lip portion 70. The first section 78 of the second face portion 76 may be spaced from the first section 60 of the first face portion such that the first section 78 of the second face portion 76 and the first section 60 of the first face portion 58 are located in opposition to each other to receive a portion of the disk drive housing 3 therebetween that is located adjacent to the first side surface 11.

The second face portion 76 may further include a second section 80 that extends between the front end portion 48 and the first side portion 52 in opposition to the second section 74 of the first face portion 58, and the second section 80 and the second section 74 may form a pocket with the front end portion 48 and the first side portion 52 for receiving a corner of the disk drive housing 3. The second section 80 of the second face portion 76 may have a substantially triangular shape similar to the second section 74.

A release handle 82 may be provided on the disk drive holder 24, and may be located on the first side portion 52. The release handle 82 may extend from a rear of the first side portion 52. The release handle 82 may include a first extent 84 that may extend substantially parallel to the first side surface 11 of the housing 3 when the holder 24 is mounted on the housing. The first extent 84 is free of connection to the first face portion 58 (except through the first side portion 52), so the first extent 84 may be flexed and moved away from the first side surface 11 to facilitate removal of the outer housing 3 from the disk drive holder 24, but also permits the first extent 84 to be moved toward the housing 3 to facilitate removal of the holder 24 from the drive mounting cage 22. The release handle 82 may also include a second extent 86 that is mounted on the first extent 84 and which may extend beyond the rear lip portion 66 such that the released handle extends beyond the rear end of the disk drive housing 3 when the housing is positioned in the holder 24. The second extent 86 may be arcuate in character, such that a portion of the curved portion extends through a plane of the first inner surface 56 of the first side portion 52. The release handle 82 may be moved by flexing it away from the side section 40 of the perimeter wall 26 of the drive mounting cage 22 by, for example, pressing the second extent 86 inwardly toward the rear end surface 7 of the drive housing 3.

An engaging tab 88 (see FIG. 5 through 7) may be located on the release handle 82 for releasably engaging the aperture 46 in the perimeter wall 26 of the drive mounting cage 22 when the disk drive holder 24 is fully inserted into the cage 22, and thereby resisting, outward movement of the holder with respect to the cage 22. The engaging tab 88 may be located on the first extent 84 of the release handle, and may extend outwardly from an outer surface of the release handle. Movement of the second extent 86 of the release handle 82 away from the side section 40 of the perimeter wall 26 may move the engaging tab 88 out of the aperture 46, and the engaging tab does not resist movement of the holder 24 out of the cage 22. The holder 24 may then be relatively easily slid out of the cage 22, at least partially, to permit removal of the drive housing 3 from the holder 24. In some embodiments, the disk drive holder 24 may be partially trapped or captured in the mounting cage 22 so that only partial withdrawal of the holder 24 from the cage is possible.

The disk drive holder 24 may also include a clip portion 90 that is located on the first side portion 52 of the holder 24 and that is provided to receive a portion of a rearward edge 44 of the perimeter wall 26 that is located adjacent to the opening 28. The clip portion 90 may extend rearwardly from a rear of the first side portion 52, in an orientation that is generally parallel to the first extent 84 of the release handle 82. The clip portion 90 may comprise a rearwardly extending extent 92 and a forwardly extending extent 94, so that the clip portion forms a substantially U-shaped clip that is able to receive (and may even clamp onto) a portion of the side section 40 of the perimeter wall. The clip portion 90 helps to retain the disk drive holder 24 in the mounting cage 22.

Most suitably, the disk drive holder 24 is at least partially formed from a resiliently flexible material that permits the holder to be flexed to a degree by using human hand-applied force, but the material exhibits a degree of resistance to such flexure and substantially returns to the original size and shape after the hand-applied force is removed. Other materials exhibiting these characteristics may also be used, and some portions of the holder may be formed of relatively more rigid materials. In some of the most suitable embodiments of the invention, the entire holder is formed using a plastic material.

It will be recognized by those skilled in the art that disk drive housings may differ in the character of the faces or surfaces, and therefore the terms "face" and "surface" are used in their broadest sense to not only cover smooth metal surfaces but also variegated surfaces of different materials, including circuit boards.

The foregoing is considered as illustrative only of the principles of the invention. Further, since numerous modifications and changes will readily occur to those skilled in the art in view of the disclosure of this application, it is not desired to limit the invention to the exact embodiments, implementations, and operations shown and described. Accordingly, all equivalent relationships to those illustrated in the drawings and described in the specification, including all suitable modifications, are intended to be encompassed by the present invention that fall within the scope of the invention.

We claim:

1. A disk drive mounting system for mounting at least one disk drive on a computer chassis, the disk drive being of the type having a housing with a front end, a rear end, a first major surface extending between the front end and the rear end, a second major surface extending between the front end and the rear end, a first side surface extending between the front end and the rear end, a second side surface extending between the front end and the rear end, the disk drive mounting system comprising:

a drive mounting cage for mounting on a chassis of a computer, the drive mounting cage including a perimeter wall defining an interior with a rear opening; and a disk drive holder that is captured within the drive mounting cage so as to be partially withdrawable from the drive mounting cage through the rear opening while captured, while being trapped against complete removal from the drive mounting cage while captured, for removably receiving a disk drive when the disk drive holder is partially withdrawn from the drive mounting cage, to removably mount the disk drive on the drive mounting cage, the disk drive holder comprising:

a front end portion for positioning adjacent to at least a portion of the front end of the disk drive housing when the disk drive housing is positioned in the disk drive holder;

a first side portion for positioning adjacent to at least a portion of the first side of the disk drive housing when the disk drive housing is positioned in the disk drive holder;

a first face portion for positioning adjacent to at least a portion of the first major surface of the disk drive housing when the disk drive housing is positioned in the disk drive holder; and a second face portion for positioning adjacent to at least a portion of the second major surface of the disk drive housing when the disk drive housing is positioned in the disk drive holder.

2. The disk drive mounting system of claim 1 additionally comprising a release handle located on the first side portion for permitting moving of the first side portion with respect to the disk drive housing when the disk drive housing is positioned in the disk drive holder, the release handle extending from a rear of the first side portion beyond the rear end of the disk drive housing when the disk drive housing is positioned in the disk drive holder, wherein when the disk drive housing is positioned in the disk drive holder and the disk drive holder is partially withdrawn from drive mounting cage through the rear opening while captured, the release handle is movable away from the disk drive housing to allow the disk drive to be removed from the disk drive holder and the drive mounting cage through the rear opening.

3. The disk drive mounting system of claim 2 wherein the perimeter wall of the drive mounting cage includes an aperture extending therethrough, and an engaging tab is located on the release handle and configured to engage the aperture when the disk drive holder is fully inserted into the drive mounting cage.

4. The disk drive mounting system of claim 1 wherein the disk drive holder additionally comprises a clip portion located on the first side portion for receiving a portion of the perimeter wall of a disk mounting cage when the disk drive holder is fully inserted into the drive mounting cage.

* * * * *